June 30, 1970     T. B. BISSETT ET AL     3,518,501
ELECTROCHEMICAL CELL CIRCUITS
Filed March 7, 1968     3 Sheets-Sheet 1
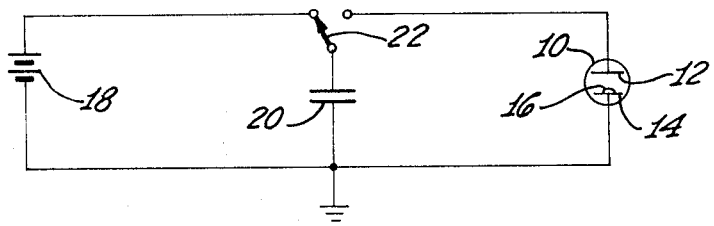
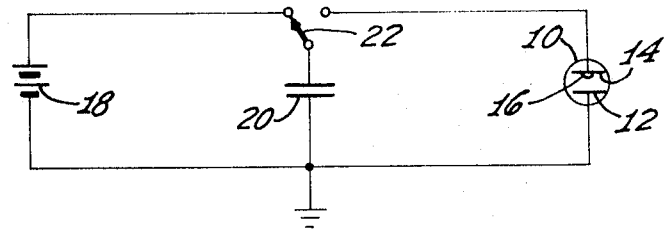
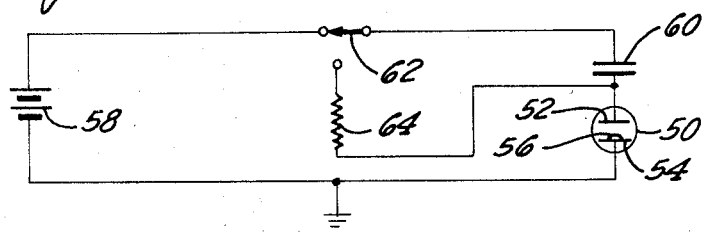
INVENTORS:
Thomas B. Bissett
John Brian Murphy
ATTORNEYS

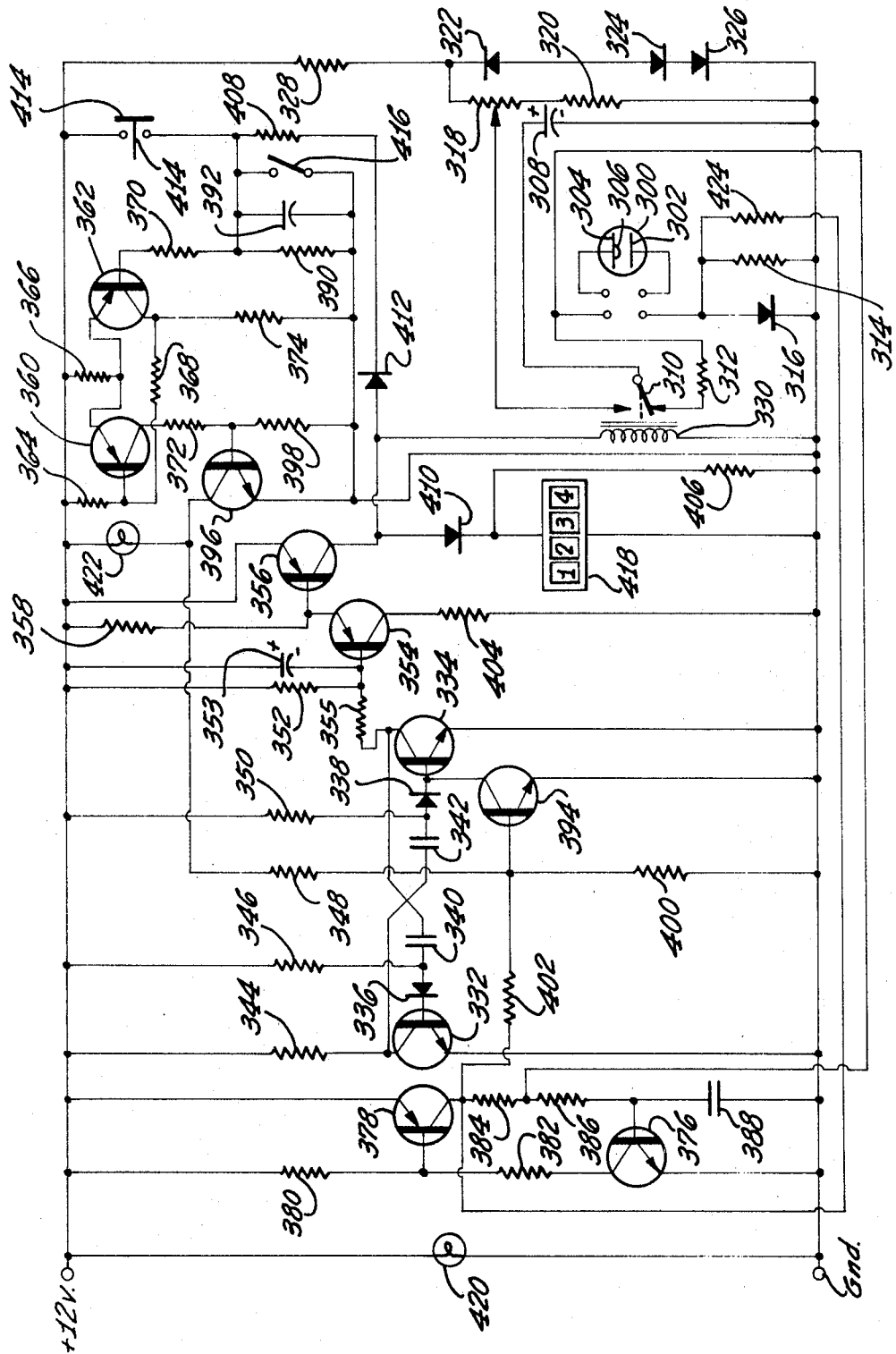

United States Patent Office 3,518,501
Patented June 30, 1970

3,518,501
ELECTROCHEMICAL CELL CIRCUITS
Thomas B. Bissett, Malibu, and John Brian Murphy, Culver City, Calif., assignors to The Bissett-Berman Corporation, Santa Monica, Calif., a corporation of California
Filed Mar. 7, 1968, Ser. No. 711,311
Int. Cl. H01g 9/00
U.S. Cl. 317—231                           22 Claims

ABSTRACT OF THE DISCLOSURE

This invention is directed to electrical circuits associating an electrochemical cell with a capacitor. Specifically, the invention includes an electrochemical cell, which cell includes a pair of electrodes and with the cell containing an active material for transfer between the electrodes. A capacitor having a particular capacitance value is charged by a voltage source and with the charge on the capacitor determining the transfer of a predetermined charge of active material between the pair of electrodes in the electrochemical cell. The invention includes the association of the capacitor with the electrochemical cell so as to form circuits such as time generating circuits, time delay circuits and readout circuits. In each case, either an electrochemical cell has a particular charge of active material transferred in accordance with the charging of a capacitor or the discharging of a precharged capacitor.

---

The electrochemical cell referred to in this application is a circuit element that provides for the transfer of a physical material between electrodes and which has a resistance value in accordance with the transfer. The electrochemical cell may be used in association with other elements so as to form a variety of circuits. Generally, the electrochemical cell includes at least a pair of electrodes and with an active material contained within the electrochemical cell for transfer between the electrodes.

One specific form of electrochemical cell includes an outer housing formed of an active material, which outer housing serves as a first electrode. A second inner electrode is positioned within and insulated from the outer housing. The inner electrode may have at least a coating of an inert material. An electrolytic solution is also contained within the outer housing. The active material which forms the outer housing may be transferred to and from the inner electrode. A greater understanding of the electrolytic cell described above may be had with reference to copending application Ser. No. 519,634, filed in the name of Martin Mintz on Jan. 10, 1966 now Pat. 3,423,648, and assigned to the same assignee as the instant application.

The electrochemical cell described above may be used in a variety of electrical circuits. For example, the transfer of active material may representative of a particular quantity of information. Since this transfer of active material is both current and time dependent, the charge of active material transferred is in accordance with the total quantity of information. In addition to the use of the electrochemical cell as a storage device, a predetermined charge of active material may be transferred from one electrode to the other and this predetermined quantity of active material then discharged back to the original electrode. The discharge current may be set so that a particular time is required to discharge the active material back to the original electrode, and this type of a circuit, therefore, operates as a timer. There are many variations using the electrochemical cell, either as a storage device or at timing device.

One property of the electrochemical cell which makes the cell particularly valuable as a circiut element is that when all of the active material has been discharged from one of the electrodes, the resistance value across the electrochemical cell rises. Therefore, when a current is applied to the electrochemical cell to remove active material from one electrode, the time when all of the active material is removed is indicated by a rise in voltage across the electrochemical cell.

One major problem with the use of the electrochemical cell as a circuit element has been the method of transferring a predetermined charge of active material in an accurate and reliable fashion. Usually, a constant current is passed through the electrochemical cell so as to transfer the active material and the time during which the current is passed through the electrochemical cell is monitored. It can be seen, therefore, that, in order to accurately determine two variables, the transfer of active material must be accurately monitored. That is, variables of the current and the time must be accurately monitored. It is relatively difficult to monitor and accurately control these variables and this, of course, increases the complexity and the expense of various circuits using the electrochemical cell.

The present invention is directed to a very accurate and simple method in which a predetermined charge of active material is transferred between the electrodes in the electrochemical cell. Specifically, the transfer of active material between the electrodes is in accordance with the charge across a capacitor. The transfer of active material between the electrodes in the electrochemical cell may either be controlled during the charging of the capacitor or during the discharging of the capacitor. In either siutation, the charge across the capacitor is reflected in the cell as a transfer of a particular charge of active material between the electrodes in the electrochemical cell.

The present invention eliminates the necessity for accurately controlling current and time, since the charge across a capacitor is dependent upon the applied voltage and the capacitance value of the capacitor. Specifically, the electrochemical cell and the capacitor may be interconnected in a series circuit so that as the capacitor is charged, the charging current also flows through the electrochemical cell. Once the capacitor is completely charged, the charging current is reduced to essentially zero. Therefore, the total current necessary to charge the capacitor is also used to transfer a particular charge of active material between the electrodes within the electrochemical cell.

As indicated above, the charge across the capacitor is in accordance with the capacitance value of the capacitor and the voltage applied across the capacitor. The capacitance value of the capacitor may, of course, be preselected and the voltage is relatively easy to control so that the charge across the capacitor may be accurately determined. Another important advantage of the method of the present invention is that the transfer of active material within the electrochemical cell is not time-dependent but is charge-dependent, and since the charge is simpler to control compared to time, the circuits using the combination of the capacitor and the electrochemical cell are simpler, more accurate and less expensive than prior art circuits.

The second method by which the capacitor may be associated with the electrochemical cell is to initially charge the capacitor to a predetermined level and then to discharge the capacitor through the electrochemical cell with the discharging current producing the transfer of active material between the electrodes. By either method, the transfer of active material is in accordance with the charge across the capacitor.

The present invention, in addition to the general method including circuitry involving the association of a capacitor and an electrochemical cell also provides for particular circuit embodiments. Specifically, the present invention includes embodiments of a time generating circuit, a time delay circuit and a digital readout circuit.

In the time generating circuit of the present invention, a charged capacitor is discharged through an electrochemical cell thereby transferring a particular charge of active material from one electrode to a second electrode within the electrochemical cell. A constant current is then applied across the electrochemical cell to transfer the active material from the second electrode back to the first electrode. When all of the active material has been transferred back to the first electrode, the voltage across the electrochemical cell rises, thereby producing an output signal in accordance with the rise of voltage. The time generating circuit then recycles by once more discharging the charged capacitor through the electrochemical cell and with the constant current applied to the electrochemical cell for retransferring the active material back to the first electrode. In the particular embodiment shown in this application, the time-generating circuit produces output pulses separated by a particular time interval. One of the advantages of the use of the electrochemical cell for the time-generating circuit is that the time interval may be arranged to be quite long, for example, in minutes, as opposed to prior art circuits wherein the time interval between succeeding output pulses is in seconds or less.

In the time delay circuit of the present invention, a capacitor is charged from a voltage source and with the charge current passing through the electrochemical cell to transfer active material from a first electrode to a second electrode in accordance with the charge current. Once the capacitor is charged, the charge current is essentially zero and no more active material is transferred from the first electrode to the second electrode. A second current is applied to transfer the active material from the second electrode back to the first electrode. When all of the active material has been transferred from the second electrode back to the first electrode, the voltage across the electrochemical cell rises, thereby controlling an output circuit. The circuit is initially energized by closing a switch so as to produce the charging of the capacitor and at some predetermined time interval the output circuit is energized by the rise in voltage across the electrochemical cell. This time delay may be considerably larger than possible with conventional circuits. For example, the time delay can be measured in minutes rather than in seconds.

As another embodiment of an electrical circuit using the association of a capacitor with an electrochemical cell, a digital readout device is described. In the digital readout device, the electrochemical cell has previously been used as a storage element to monitor a particular quantity of information and wherein this information is stored in the electrochemical cell as a charge of active material which has been transferred from a first electrode to a second electrode. The digital readout unit of the present invention repetitively charges and discharges a capacitor through the electrochemical cell in a direction to transfer active material from the second electrode back to the first electrode. In this way, each discharge of the capacitor removes a particular charge of the active material from the second electrode. By counting the number of times it takes to charge the capacitor and then discharge the capacitor through the electrochemical storage element, an indication is provided of the original charge of active material on the first electrode. The values of the components in the digital readout device are provided to give a direct digital reading representative of the quantity of information initially stored in the electrochemical cell. A clearer understanding of the invention will be had with reference to the following description and drawings wherein:

FIGS. 1a and 1b illustrate a first embodiment of the invention where a capacitor is initially charged and then discharged through an electrochemical cell;

FIG. 2 illustrates a second embodiment of the invention wherein a charging current for a capacitor passes through an electrochemical cell;

FIG. 5 illustrates a digital readout unit using a combination of an electrochemical cell and a capacitor.

Figure 3:
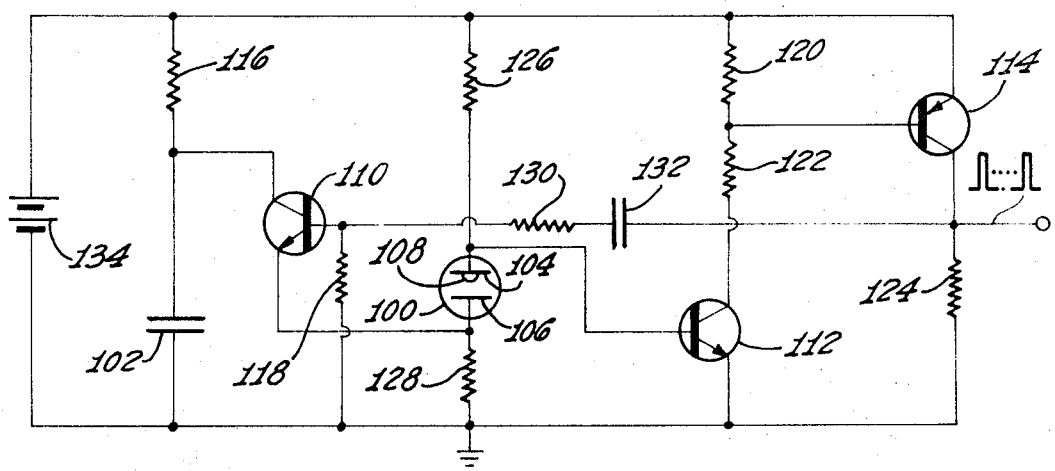
FIG. 3 illustrates a time-generating circuit using a combination of an electrochemical cell and a capacitor.

In FIGS. 1a and 1b, an electrochemical cell 10 includes a first electrode 12, a second electrode 14 and active material 16. The only difference between FIGS. 1a and 1b is that the electrochemical storage element 10 is reversed in position. Specifically with reference to an electrochemical cell of the type shown in copending application Ser. No. 519,634, the electrode 12 represents the outer electrode composed of active material and the electrode 14 represents the inner electrode containing at least a layer of inert material for receiving active material.

The embodiments of FIGS. 1a and 1b also include a voltage source 18, a capacitor 20 and control means such as a switch 22 having a first state providing a high impedance and having a second state providing a low impedance. FIG. 1a would usually represent an embodiment of the invention wherein the electrochemical cell 10 is to be preset with a particular quantity of active material 16 transferred from electrode 12 to electrode 14 by the discharge of the capacitor 20. Specifically, in the operation of the circuit of FIG. 1a, switch 22 would initially be in the position shown. At this time, the voltage source 18 charges the capacitor 20 and with the particular charge dependent upon the capacitance value of the capacitor 20 and the value of the voltage 18.

The switch 22 is then operated to the position opposite to that shown in FIG. 1a so as to connect the capacitor 20 across the electrochemical cell 10. At that time, discharging current flows from the capacitor 20 through the electrochemical cell 10 to produce a transfer of the active material 16 from the electrode 12 to the electrode 14. The particular charge of active material which is transferred is directly dependent upon the charge of the capacitor.

As can be seen, the circuit of FIG. 1a is not time-dependent in that the charging of the capacitor 20 and the discharging of the capacitor 20 have no relation to time but only to the total charge present across the capacitor. In other words, once the capacitor 20 is fully charged by the voltage source 20, maintaining the voltage source across the capacitor 20 for some additional length of time does not affect the charge across the capacitor. Also, once the capacitor 20 has discharged completely through the electrochemical cell 10, maintaining the capacitor 20 across the electrochemical cell has no effect on the transfer of active material between the electrodes and the electrochemical cell. FIG. 1a, therefore, provides for an accurate, simple and inexpensive way in which to transfer a predetermined charge of active material between electrodes in an electrochemical cell.

In FIG. 1b it is assumed that the electrochemical cell already has had active material 16 transferred to the electrode 14. The electrochemical cell 10 has, therefore, been used previously for storage of some information. The capacitor 20 is initially charged by the voltage source 18 when the switch 22 is in the position shown in FIG. 1b. Once the capacitor 20 is charged, the switch may be reversed and the capacitor 20 is discharged through the electrochemical cell 10. At this time, a particular charge of active material 16 is transferred back from the electrode 14 to the electrode 12. This charge-discharge operation may be repeated several times until the electrochemical cell has all of its active material returned to the electrode 12. By counting the number of times the charge-discharge cycle is performed, a reading of the initial storage of active material 16 on the electrode 14 may be provided. The embodiment of FIG. 1b may, therefore, be used as a readout device, which readout device is not time sensitive.

FIG. 2 illustrates an embodiment of the invention providing for a transfer of a particular charge of active material wherein the transfer occurs upon the charging of a capacitor. In FIG. 2, an electrochemical cell 50 includes a first electrode 52, a second electrode 54 and active material 56. The cell 50 may be of the same type that is referred to with reference to FIGS. 1a and 1b. In addition, the circuit of FIG. 2 includes a voltage source 58, a capacitor 60, a switch 62 and a resistor 64.

The embodiment of FIG. 2 represents the setting of a particular charge of active material 56 from the electrode 52 to the electrode 54. In the embodiment of FIG. 2, the switch 62 would initially be in the position shown in FIG. 2. At this time, the capacitor 60 and electrochemical cell 50 are in series and are across a voltage source 58. A charging current, therefore, flows through the capacitor 60 and the electrochemical cell 50 to provide for a transfer of active material 56 from the electrode 52 to the electrode 54. When the capacitor 60 is completely charged, the charging current is reduced to zero and the voltage across the electrochemical cell 50 is also zero. The transfer of active material 56 between the electrodes 52 and 54 is, therefore, dependent upon the charge across the capacitor 60 and is not time dependent but is only dependent upon the capacitance of the capacitor 60 and the value of the voltage source 58. The capacitor 60 may be discharged by operating the switch 62 to the position to discharge the capacitor 60 through the resistor 64.

It can be seen, therefore, that the combination of the capacitor and electrochemical cell to provide for a transfer of active material between the electrodes in the electrochemical cell in accordance with the charge on the capacitor provides a unique time-insensitive method by which to transfer active material within an electrochemical cell.

FIG. 3 illustrates a first specific embodiment of a device incorporating the interrelationship of the capacitor and the electrochemical cell. Specifically, the embodiment of FIG. 3 is directed to a time-generating circuit. The embodiment of FIG. 3 includes an electrochemical cell 100 and a capacitor 102. The electrochemical cell 100 includes a pair of electrodes 104 and 106 and contains active material 108. The electrochemical cell 100 may be of the type described with reference to FIGS. 1 and 2. The circuit of FIG. 3 also includes three transistors 110, 112, and 114 and a plurality of resistors 116, 118, 120, 122 and 124 and associated with the transistors to provide for the proper biasing and load for the transistors.

In addition, resistors 126 and 128 are used to determine the current flow through the electrochemical cell 100. A time-delay circuit, including a resistor 130 and a capacitor 132, provides for a time delay between the output of the transistor 114 and input to the transistor 110. Finally, a voltage source 134 provides power for the circuit.

First, it is assumed that the electrochemical cell 100 has had a charge of active material transferred from the electrode 106 to the electrode 104 and that this active material is shown by active material 108. If the electrochemical cell were of the type shown in copending application Ser. No. 519,634, now Pat. 3,423,648, the electrode 104 would be the inner electrode and the electrode 106 would be the outer electrode composed of the active material. A discharging current flows from the voltage source 134 through the circuit including the resistor 126, the electrochemical cell 100 and the resistor 128 to a reference potential such as ground.

As the discharging current is flowing it is transferring the active material 108 to the electrode 106. When all of the active material 108 has been transferred to the electrode 106, the voltage across the electrochemical cell 100 rises to turn on transistor 112. The turning on of the transistor 112 controls the turning on of the transistor 114. Also, the output from the transistor 114 is coupled through the R-C time delay circuit including the resistor 130 and capacitor 132 to turn on transistor 110. The capacitor 102 has been precharged and has been maintained in this charged condition by the voltage source 134 through the resistor 116. When the transistor 110 is turned on, the capacitor 102 discharges through a circuit including the transistor 110, the electrochemical cell 100 and the base emitter junction of the transistor 112 to the reference potential such as ground. This discharge of the capacitor 102 produces a transfer of a particular charge of active material 108 from the electrode 106 to the electrode 104.

The embodiment of FIG. 3 would be maintained in the discharging condition if it were not for the action of the R-C time delay including the resistor 130 and the capacitor 132. When the capacitor 132 is charged to a particular quantity, the current to the base of the transistor 110 is lowered, thereby turning off the transistor 110. At the time the discharging circuit for the capacitor 102 is interrupted. The voltage across the electrochemical cell 100 is also low since active material is now present on both electrodes 104 and 106. The transistors 112 and 114 are therefore turned off due to the low voltage across the electrochemical cell. The active material 108, therefore, is retransferred back to the electrode 106 through the circuit including the voltage source 124, the resistor 126, the electrochemical cell 100 and the resistor 128.

The current flow to transfer the active material 108 back to the electrode 106 may be set to be relatively low so that it takes an appreciably longer time to transfer all of the active material 108 back to the electrode 106 as compared with the time in which it took to transfer the active material 108 to the electrode 104 during the discharging of the capacitor 102. The output from the circuit of FIG. 3 may, therefore, be taken across resistor 124 and, as shown, the output would consist of a series of pulses separated by a predetermined time. The time interval between the pulses may be measured in minutes, as opposed to seconds for prior art time-generating circuits.

Figure 4:
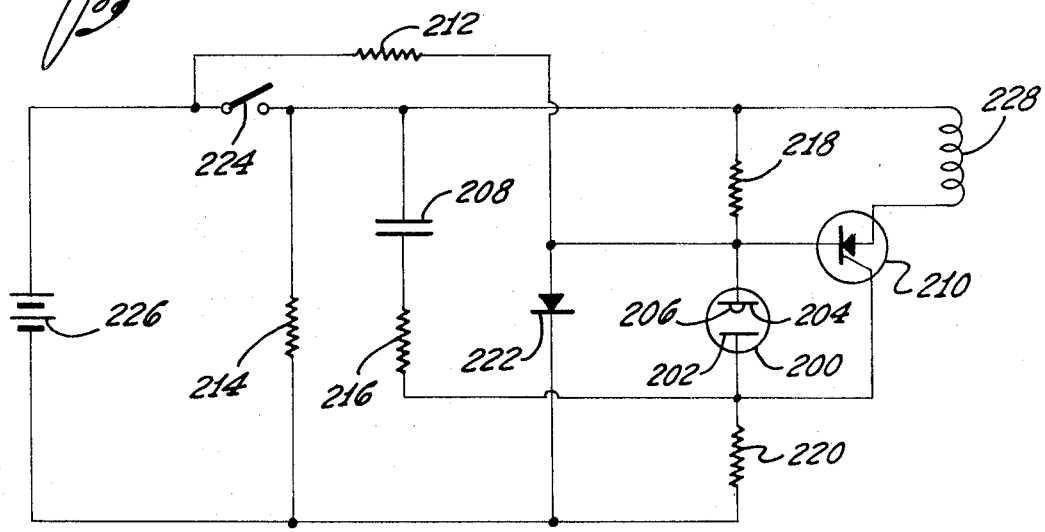
FIG. 4 illustrates a time-delay circuit using a combination of an electrochemical cell and a capacitor.

FIG. 4 illustrates a second specific embodiment of the invention using the combination of the electrochemical cell and a capacitor. Specifically, the embodiment of FIG. 4 is directed to a time-delay circuit. In FIG. 4, an electrochemical cell 200 includes electrodes 202 and 204 and contains active material 206. A capacitor 208 is also included in the circuit of FIG. 4. In addition to the above, the circuit of FIG. 4 contains a silicon-controlled rectifier 210. Resistors 212, 214, 216, 218 and 220 are also included to control the current in the circuit. The circuit of FIG. 4 may also include control means such as a diode 222 having a first state providing a high impedance, and a second state providing a low impedance, a switch 224, a voltage source 226 and a coil 228 which coil represents an output load such as the coil of a solenoid.

In the operation of the embodiment of FIG. 4, the capacitor 208 is initially in a discharged condition. As can be seen in FIG. 4, the capacitor would be kept in this discharge condition by the discharge path provided by the resistors 214, 216 and 220. The switch 224 is thrown so as to connect the voltage source 226 across the capacitor 208. The capacitor 208 now charges from the voltage source 226 through a circuit including the capacitor 208, the resistor 216, the electrochemical cell 200 and the diode 222, to a reference potential such as ground. A portion of the charging current also passes through the resistor 220 to the reference potential such as ground, but the resistor 220 may have a large value so that this portion of the charging current is relatively small.

The current through the electrochemical cell during the charging of the capacitor 208 is in a direction to produce a transfer of active material 206 from the electrode 202 to the electrode 204. This transfer of active material may be a relatively large predetermined charge of active material. Once the capacitor 208 is charged, no more charging current flows through the electrochemical cell 200 in the direction to transfer active material from the electrode 202 to the electrode 204.

However, it is to be noted that with the switch 224 in the closed position, the voltage source also produces a discharging current through a path including the resistor 218, the electrochemical cell 200 and the resistors 220. This discharging current flow is in a direction to transfer the active material 206 from the electrode 204 to the electrode 202. This discharging current is relatively small but after some appreciable time all of the active material will be transferred from the electrode 204 to the electrode 202.

When all of the active material is removed from electrode 204, the voltage across the electrochemical cell 200 rises, thereby triggering the SCR 210. The triggering of the SCR produces a load current through an output device such as the coil 228 of a solenoid. The electrochemical cell has, therefore, been set with a charge of active material dependent upon the charge across the capacitor, and this charge of active material is not time dependent. The time delay before the SCR is activated may extend for a relatively long period of time which delay may be measured in minutes rather than seconds as with prior art devices. Therefore, in the embodiment of FIG. 4, when the switch 224 is activated, the output current through the load such as the coil 228 of the solenoid may not occur for some minutes.

FIG. 5 shows a third specific embodiment of a circuit including a combination of a capacitor and an electrochemical cell. Specifically, the embodiment of FIG. 5 is a digital readout unit. In FIG. 5, an external electrochemical cell 300 may be connected into the circuit. The cell includes a pair of electrodes 302 and 304 and wherein electrode 304 contains a quantity of active material 306 representative of a quantity of stored information. A capacitor 308 is alternately connected to a source of voltage and to the electrochemical cell 300 by a switch 310. A pair of resistors 312 and 314 and a diode 316 are also connected in the discharging circuit for the capacitor. The source of voltage is provided from a voltage supply including a potentiometer 318, a resistor 320, a Zener diode 322, a pair of diodes 324 and 326 and a resistor 328. The above components provide a variable voltage regulated source of voltage.

The switch 10 is controlled by a solenoid 330. The circuit of FIG. 5 also includes a flip-flop which acts as a counter of approximately 10 cycles per second. The flip-flop is constructed of the transistors 332 and 334, the diodes 336 and 338, the capacitors 340 and 342 and the resistors 344, 346, 348 and 350.

The circuit of FIG. 5 also includes an amplifier constructed from a pair of transistors 354 and 356 and biasing resistors 352 and 358 and a capacitor 353. A resistor 355 couples the flip-flop to the amplifier. A Schmitt trigger is included in the circuit of FIG. 5 and is constituted by transistors 360 and 362 with associated biasing resistors including resistors 364, 366, 368, 370, 372 and 374. A voltage-sensing circuit includes transistors 376 and 378 with associated resistors 380, 382, 384 and 386 and capacitor 388.

In addition to the above, the circuit of FIG. 5 includes a 10-second time delay, or some appreciable length time delay, composed of resistor 390 and capacitor 392. Other circuitry includes transistors 394 which is used to short out the flip-flop and transistor 396. Resistors 398, 400, 402, 404, 406, 408 and 424 and diodes 410 and 412 are also part of the digital readout device. The circuit also includes a start switch 414, a stop switch 416, an output meter 418, and lights 420 and 422.

Assuming the electrochemical cell 300 to have just discharged so that all of the active material has been transferred from electrode 304 to electrode 302, at this time the voltage across the electrochemical cell rises, which in turn produces a rise in voltage at the base of the transistor 376. The transistor 376, therefore, turns on to turn on transistors 378 and 394. When transistor 394 is on, this essentially shorts out the flip-flop counter.

Before transistor 334 was shorted out, the flip-flop counter which included the transistors 332 and 334 operated at some low frequency such as 10 cycles per second. When the flip-flop counter was operated, it drove transistors 354 and 356, which constituted an amplifier, and the output of the amplifier controlled the meter 318 and the solenoid 330. It can be seen, therefore, that until all of the active material is removed from the electrode 304 and transferred to the electrode 302, the counter 318 operates at some frequency rate such as 10 cycles per second. At the same time the counter is operated at a particular rate, the solenoid 330 is operating the switch 310 at the same rate. The capacitor 308 is, therefore, charged and then discharged through the electrochemical cell at the same rate as the operation of the counter 318. Therefore, as the active material 306 is transferred from the electrode 304 to the electrode 302 in accordance with a repetitive charge and discharge of the capacitor 308, the counter 418 is counting the repetitions. When all of the active material is transferred to the electrode 302, the voltage-sensing circuit, including the transistors 376 and 378, shorts out the counter, including the transistors 332 and 334, by turning on the transistor 394.

Assuming that some active material is present on the electrode 304 and that the electrochemical cell 300 is inserted in the readout device, the initial operation of the readout device is activated by pushing the start button 414. At this time, the capacitor 392 is charged. The Schmitt trigger, including the transistors 360 and 362, keep transistor 396 on, and, in addition, the light 422 is also on. The capacitor 392 is kept charged by the passage of current from the transistor 356 and through the diode 412.

When the flip-flop counter, which includes transistors 332 and 334, is off, the transistor 356 no longer supplies power to the capacitor 392. At this time the capacitor 392 discharges to eventually turn off the Schmitt trigger, including the transistors 360 and 362. When the Schmitt trigger is off, the transistor 396 is also off and the light 422 is turned off. The voltage at the collector of the transistor 396 rises when the Schmitt trigger is off, and this rise in voltage maintains the transistor 394 on.

Therefore, once the capacitor 392 has discharged for a particular amount of time so that the Schmitt trigger is off, it does not matter if the voltage across the electrochemical cell goes down. Once the voltage across the electrochemical cell rises and stays in this condition for a period of time longer than the time delay provided by the capacitor 394 and the resistor 390, the readout circuit is maintained off and the counter no longer counts. However, if the voltage across the electrochemical cell rises but then goes down before the time delay, the readout circuit will continue to count. This time delay allows for the readout of the electrochemical cells which may have false rises in voltage before all of the active material has been transferred to the electrode 302.

The present invention, therefore, provides for a transfer of a predetermined charge of active material between electrodes in an electrochemical cell in accordance with the charge across the capacitor. This transfer is time independent and is simple, accurate and reliable. It is to be appreciated that the invention has been described with reference to particular embodiments but that adaptations and modifications may be made. The invention is, therefore, only to be limited by the appended claims.

What is claimed is:
1. An electrical circuit comprising:
   an electrochemical cell having an electrolyte and a pair of electrodes, said cell containing an active material electrochemically transferable from either of said electrodes to the other, a capacitor and a source of voltage, circuit means for connecting the capacitor in a capacitor-charging circuit with said source, and circuit means, including switch means, for switching the capacitor from such charging circuit into a discharging series circuit with said cell, whereby the material transfer in the cell is proportioned to the charge on the capacitor.

2. The electrical circuit set forth in claim 1 wherein the switch means disconnects the capacitor from the voltage source when the capacitor is switched into the discharge circuit with the electrochemical cell.

3. The electrical circuit set forth in claim 1 wherein the capacitor-charging circuit includes the electrochemical cell and the capacitor in series and the capacitor-discharging circuit includes the electrochemical cell and the capacitor in series.

4. The electrical circuit set forth in claim 3 wherein an impedance element is connected in series with the electrochemical cell and the capacitor in the capacitor-discharging circuit to receive the energy from the capacitor.

5. The electrical circuit set forth in claim 3 wherein the switch means disconnects the capacitor from the voltage source when the capacitor is switched into the discharge circuit with the electrochemical cell.

6. The electrical circuit of claim 1 wherein the electrochemical cell initially contains a charge of active material on a first one of the pair of electrodes and wherein the material transfer in the cell is in a direction to transfer the active material from the first one to a second one of the pair of electrodes and wherein the capacitor is charged and discharged repeatedly until all of the initial charge is removed from the first one of the electrodes.

7. An electrical circuit, including, a voltage source, a capacitor, an electrochemical cell having an electrolyte and a pair of electrodes and containing active material electrochemically transferable from either of the electrodes to the other, switch means having first and second operable relationships, first means for interconnecting the voltage source and the capacitor in a first circuit arrangement, in the first operable relationship of the switch means, to charge the capacitor to a particular charge, and second means for interconnecting the capacitor and the electrochemical cell, in the second operative relationship of the switch means, to discharge the capacitor through the electrochemical cell for a transfer of a particular charge of active material between the electrodes in accordance with the particular charge on the capacitor.

8. The electrical circuit set forth in claim 7 wherein the electrochemical cell initially contains a charge of active material on a first one of the pair of electrodes and wherein the material transfer in the cell is in a direction to transfer the active material from the first one to a second one of the pair of electrodes and wherein the capacitor is charged and discharged repeatedly until all of the initial charge is removed from the first one of the electrodes.

9. The electrical circuit set forth in claim 7 wherein the electrochemical cell is disconnected from the voltage source and the capacitor in the first operative relationship of the switch means and the voltage source is disconnected from the electrochemical cell and the capacitor in the second operative relationship of the switch means.

10. The electrical circuit set forth in claim 9 wherein the capacitor is in series relationship with the voltage source in the first operative relationship of the switch means and is in a series relationship with the electrochemical cell in the second operative relationship of the switch means.

11. The electrical circuit set forth in claim 10 wherein the electrochemical cell and the capacitor are in a series relationship with the voltage source in the first operative relationship of the switch means and the electrochemical cell and the capacitor are in a series relationship in the second operative relationship of the switch means.

12. An electrical circuit, including, an electrochemical cell having an electrolyte and a pair of electrodes, said cell containing an active material electrochemically transferable from either of said electrodes to the other, a capacitor, a source of voltage, control means having a first state providing a high impedance and having a second state providing a low impedance, circuit means for connecting the capacitor, with the control means in the first state, in a capacitor-charging circuit with the source, and circuit means for providing a capacitor-discharging circuit, with the control means in the second state, to obtain a discharge of the capacitor through the electrochemical cell.

13. The electrical circuit set forth in claim 12 wherein circuit means are included for activating the capacitor-charging circuit upon each discharge of the capacitor through the electrochemical cell.

14. The electrical circuit set forth in claim 12 including means responsive to the discharge of the capacitor through the electrochemical cell for providing an output indication and such output indication occurring at a particular period of time after the capacitor-charging circuit has started to charge the capacitor.

15. The electrical circuit set forth in claim 12 wherein the capacitor and the voltage source are in a series relationship in the capacitor-charging circuit, with the control means in the first state, and the electrochemical cell is disconnected from the capacitor and wherein the capacitor and the electrochemical cell are in a series relationship in the capacitor-discharging circuit, with the control means in the second state, and the voltage source is disconnected from the capacitor and the electrochemical cell.

16. The electrical circuit set forth in claim 12 wherein the capacitor and the voltage source and the electrochemical cell are in a series relationship in the capacitor-charging circuit, with the control means in the first state, and wherein the capacitor and the electrochemical cell are in a series relationship in the capacitor-discharging circuit, with the control means in the second state, and the voltage source is disconnected from the capacitor and the electrochemical cell.

17. An electrical circuit, comprising:

a voltage source, a capacitor, an electrochemical cell having an electrolyte and a pair of electrodes, said cell containing active material electrochemically transferable from either of the electrodes to the other electrode, control means having a first state providing a low impedance and a second state providing a high impedance, first means interconnecting the voltage source, the capacitor and the electrochemical cell, with the control means in the first state, for charging the capacitor to obtain a transfer of a particular charge of active material from a first one of the electrodes to the other electrode in accordance with the charging of the capacitor, second means interconnecting the electrochemical cell and the capacitor, with the control means in the second state, for discharging the capacitor to obtain a discharge of the active material from the second electrode to the first electrode in accordance with the discharging of the capacitor, and third means responsive to the transfer of all of the active material from the second electrode to the first electrode for producing an indication of such transfer.

18. The electrical circuit set forth in claim 17 wherein the voltage source, the capacitor and the electrochemical cell are in a series relationship in the first state of the control means and the capacitor and the electrochemical cell are in a series relationship, without the voltage source, in the second state of the control means.

19. The electrical circuit set forth in claim 17 wherein the control means constitutes a diode.

20. The electrical circuit set forth in claim 17 wherein the control means constitutes a semi-conductor.

21. The electrical circuit set forth in claim 17 wherein the voltage source and the capacitor are in a series relationship in the first state of the control means and the capacitor and the electrochemical cell are in a series relationship in the second state of the control means.

22. The electrical circuit set forth in claim 21 wherein the electrochemical cell is disconnected from the voltage source and the capacitor in the first state of the control means and the voltage source is disconnected from the capacitor and the electrochemical cell in the second state of the control means.

References Cited

UNITED STATES PATENTS

| | | | |
|---|---|---|---|
| 2,791,473 | 5/1957 | Mattox | 340—213 |
| 3,017,612 | 1/1962 | Singer | 340—173 |
| 3,052,830 | 9/1962 | Ovshinsky | 317—231 |
| 3,119,754 | 1/1964 | Blumenfeld et al. | 204—52 |
| 3,158,798 | 11/1964 | Sauder | 317—231 |
| 3,210,662 | 10/1965 | Steinmetz et al. | 324—94 |
| 3,423,648 | 1/1969 | Mintz | 317—231 |

FOREIGN PATENTS

| | | |
|---|---|---|
| 1,921,265 | 8/1965 | Germany. |

OTHER REFERENCES

Electronics, Nov. 16, 1964, pp. 67 to 71; an article entitled: Simple Cell Competes With Complex Components, by Herbert Feitler.

JAMES D. KALLAM, Primary Examiner

U.S. Cl. X.R.

340—173, 213